3,164,502
SOLID PROPELLANT CONTAINING IMPROVED
ASPHALT BLACK
Robert J. Convery, Wilmington, Del., assignor to Sun Oil
Company, Philadelphia, Pa., a corporation of New
Jersey
No Drawing. Filed Dec. 14, 1962, Ser. No. 244,588
2 Claims. (Cl. 149—18)

This invention relates to a solid propellant composition particularly suited for thrust reactors such as rocket engines, booster rockets and sustainers.

Composite propellants are solidified mixtures of a material having a high oxygen content suspended in an organic fuel that acts also as a binder. Asphalt and various synthetic resins have been employed in the past as binders. Asphalt received much consideration; however, it tends to slump in the fuel chamber thus altering the shape of the grain and this in turn negatively effects burning characteristics.

I have found a binder material which is moldable and which blends with an oxidizer to provide a rocket fuel having excellent physical properties and burning characteristics.

The binder material of the present invention is disclosed in application Serial No. 214,128, filed August 1, 1962, of common assignment, the disclosure of which is incorporated by reference. It is called asphalt black and it is produced in the zinc chloride treatment of heavy asphaltic materials under certain conditions. Generally speaking, the process involves reacting a heavy asphaltic petroleum fraction having an initial boiling point of from about 500–1500° F. with from .1 to 200 wt. percent $ZnCl_2$ at a temperature in the range of 220–500° C. at ambient pressure. Gas, vapor, liquid and unreacted catalyst are separated and the asphalt black is recovered. This unique material is insoluble in hexane, benzene and $CCl_4$. The X-ray diffraction pattern has a between plane spacing of 3.38–3.43 angstroms. It is characterized by a surface area ranging from about 65 to about 125 square meters per gram, infusability below 500° C. and a hydrogen to carbon molecular ratio ranging from 0.35 to 0.80.

A typical preparation of asphalt black is as follows:

The feed was the heavy bottoms resulting from vacuum distillation of Venezuelan crude oil. The bottoms or residuum had the following properties:

Initial boiling point (atmos. press.) _____ °F___ 1050
Molecular weight, average, ebullioscopic) _____ 815
Viscosity (Saybolt Universal seconds) @ 210° F. __ 580

*Elemental Analysis*

| | Wt. percent |
|---|---|
| C | 85.40 |
| H | 10.21 |
| S | 2.93 |
| N | 0.55 |
| O | 0.40 |
| Vanadium | 0.06 |
| Nickel | 0.008 |
| Iron | 0.001 |

408.6 g. of the residuum was placed in the reactor at 100° C. and atmospheric pressure and the reactor was swept with nitrogen. 104.1 g. of commercial reagent grade $ZnCl_2$ was added in powder form. 25 wt. percent (based on feed) was used. The mixture was heated to about 150° C. and stirring begun. Heating was continued and the initial reaction temperature was about 250–275° C. as evidenced by the evolution of hydrogen. The reactants were maintained at a temperature of 320–360° C. for 23 hours. The gas and vapor products were continuously flashed off at about 320° C. and the hydrocarbons separated from hydrogen by collection in an air cooled trap followed by a Dry Ice cooled trap. In addition to hydrogen the products included ethane, propane, isobutane, n-butane, isopentane, n-pentane, hexanes, propylene, butylenes, pentenes, hexenes and aromatic ends. The liquids and solids from the reactor were cooled to about 50° C. and washed with 3–500 cc. volumes of n-hexane. The liquid fraction was chromatographed on alumina in a column. A wax-oil fraction was desorbed from the column with hexane and the wax was deoiled with methyl ethyl ketone. The wax product was a micro wax having a melt point of 139° F. and a molecular weight of 605. The lube oil fraction had a viscosity index of 125 and a molecular weight of 770. Next an aromatic fraction was desorbed from the column with a mixed methanol-benzene solvent. The aromatics in the fraction were further concentrated using a clay-silica gel column employing the Shell Method (see ASTM Standards on Petroleum Products and Lubricants, 38th edition, October 1961, pp. 1235–1241). The aromatic fraction was a very viscous oil and is suitable for a rubber process oil. The asphalt black was separated by washing with methanol-$HCl$-$H_2O$ mix. The reaction produced 8.6% gas and vapor products, 50.0 wt. percent hexane solubles and 41.2 wt. percent asphalt black.

The asphalt black fuel-binder can be mixed and molded with any conventional organic or inorganic binder. Particularly suitable oxidizers include ammonium nitrate, ammonium chlorate, ammonium perchlorate, potassium perchlorate and other inorganic oxidizing salts. Metals and metal oxides can also be used.

The binder and oxidizer are thoroughly mixed in any suitable mixing apparatus. Molding is carried out at temperatures below the melting point of the particular oxidizer employed. Molding temperatures of 25–400° C. and pressures of 5000 to 25,000 are satisfactory. Safety precautions commensurate with the sensitivity of the oxidizer should be used. Known molding equipment and techniques can be used.

The composition contains from 65–95 wt. percent oxidizer based on the total composition.

A composition containing 75 wt. percent potassium nitrate and 25 wt. percent asphalt black burned continuously and evenly after ignition at a satisfactory burning rate.

The composition of the invention has a homogeneous grain composition and burns evenly while maintaining its physical shape. The melt point of the finished composition after molding is at least 200° C. or higher.

It will be realized that other agents can be added to the fuel compositions of the present invention without departing from the scope of the disclosure. For example ignition promoters, supplementary, oxidation inhibitors, plasticizers and catalysts can be added. The claims are intended to cover these obvious modifications.

I claim:
1. A solid composite propellant composition comprising a homogeneous mixture of a major amount of potassium nitrate and a minor amount of asphalt black, said latter material being characterized by insolubility in hexane and $CCl_4$ a surface area ranging from about 65 to about 125 square meters per gram and a hydrogen to carbon molecular ratio ranging from 0.35 to 0.80.

2. A solid composite propellant composition comprising a homogeneous mixture of from 65–95 wt. percent of a solid inorganic oxidizing salt and from 5–35 wt. percent of asphalt black prepared by the process of contacting a heavy asphaltic petroleum fraction having an initial boiling point of from about 500–1500° F. with zinc chloride at a temperature in the range of 220–500° C. and recovering the asphalt black.

References Cited in the file of this patent
UNITED STATES PATENTS

| | | |
|---|---|---|
| 2,984,556 | Talley | May 16, 1961 |
| 3,000,716 | Lawrence et al. | Sept. 19, 1961 |
| 3,000,717 | Mace | Sept. 19, 1961 |